United States Patent
Wang et al.

(10) Patent No.: US 11,201,940 B2
(45) Date of Patent: Dec. 14, 2021

(54) TECHNOLOGIES FOR FLOW RULE AWARE EXACT MATCH CACHE COMPRESSION

(71) Applicant: Intel Corporation, Santa Clara, CA (US)

(72) Inventors: Yipeng Wang, Hillsboro, OR (US);
Ren Wang, Portland, OR (US);
Antonio Fischetti, Limerick (IE);
Sameh Gobriel, Dublin, CA (US);
Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 832 days.

(21) Appl. No.: 15/862,311

(22) Filed: Jan. 4, 2018

(65) Prior Publication Data

US 2019/0052719 A1  Feb. 14, 2019

(51) Int. Cl.
*H04L 12/24* (2006.01)
*H04L 29/08* (2006.01)
*H04L 29/06* (2006.01)
*H04L 12/26* (2006.01)
*G06F 9/455* (2018.01)

(52) U.S. Cl.
CPC ...... *H04L 67/2842* (2013.01); *H04L 41/0803* (2013.01); *H04L 43/026* (2013.01); *H04L 69/22* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 7,474,653 | B2* | 1/2009 | Herriott | H04L 69/22 370/389 |
| 10,498,638 | B2* | 12/2019 | Jackson | H04L 45/742 |
| 10,924,403 | B2* | 2/2021 | Garro | H04L 49/25 |
| 2004/0143592 | A1* | 7/2004 | Jung | H04L 69/22 |
| 2007/0192303 | A1* | 8/2007 | Stojancic | G11C 7/1006 |
| 2014/0269718 | A1* | 9/2014 | Goyal | H04L 45/74 370/392 |
| 2015/0281125 | A1* | 10/2015 | Koponen | G06F 12/128 711/122 |
| 2017/0064048 | A1* | 3/2017 | Pettit | H04L 45/742 |
| 2017/0118114 | A1* | 4/2017 | Shelar | H04L 45/38 |
| 2017/0171065 | A1* | 6/2017 | Pettit | H04L 45/38 |
| 2019/0044856 | A1* | 2/2019 | Fischetti | H04L 45/745 |
| 2020/0287843 | A1* | 9/2020 | Zhang | H04L 49/354 |
| 2020/0351181 | A1* | 11/2020 | Koponen | H04L 49/3009 |

* cited by examiner

*Primary Examiner* — Joshua Joo
(74) *Attorney, Agent, or Firm* — Compass IP Law, PC (57) ABSTRACT

Technologies for flow rule aware exact match cache compression include multiple computing devices in communication over a network. A computing device reads a network packet from a network port and extracts one or more key fields from the packet to generate a lookup key. The key fields are identified by a key field specification of an exact match flow cache. The computing device may dynamically configure the key field specification based on an active flow rule set. The computing device may compress the key field specification to match a union of non-wildcard fields of the active flow rule set. The computing device may expand the key field specification in response to insertion of a new flow rule. The computing device looks up the lookup key in the exact match flow cache and, if a match is found, applies the corresponding action. Other embodiments are described and claimed.

22 Claims, 6 Drawing Sheets

TECHNOLOGIES FOR FLOW RULE AWARE EXACT MATCH CACHE COMPRESSION

BACKGROUND

Increasingly, network functions traditionally performed by dedicated hardware devices are being performed using general-purpose computers, such as server computers that include one or more Intel® Xeon® processors. For example, network functions such as routing, packet filtering, caching, and other network functions may be executed by a virtualization platform, which may include any combination of network function virtualization (NFV), software-defined networking (SDN), and/or software-defined infrastructure (SDI).

Typical virtual switches, such as Open vSwitch, include an exact match cache (EMC) that caches recently forwarded flows and their associated rule or action. The EMC may significantly improve throughput of the virtual switch by avoiding expensive lookups to more complex flow tables. Typical virtual switches allocate a fixed amount of memory for each entry of the EMC that is large enough to include the full header of each flow.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
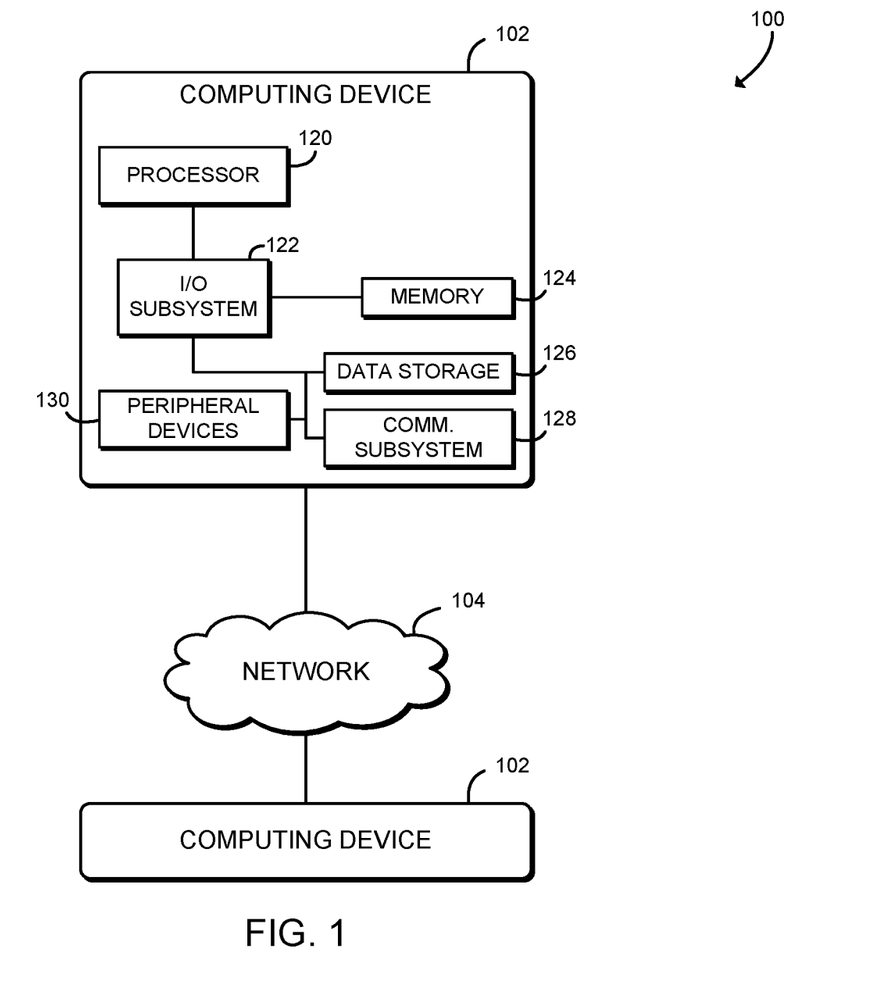
FIG. 1 is a simplified block diagram of at least one embodiment of a system for flow rule aware exact match flow cache compression.

Referring now to FIG. 1, in an illustrative embodiment, a system 100 for flow rule aware exact match cache compression includes multiple computing devices 102 in communication over a network 104. Each computing device 102 may receive a network packet, extract one or more header fields from the packet, and match the header fields against an exact match flow cache (EMC). The extracted header fields are defined by a key field specification of the EMC, which is determined based on the current flow rule set of the computing device 102. In some embodiments, the computing device 102 may dynamically configure (including dynamically compress and/or expand) the EMC based on the current or active flow rule set. Accordingly, the computing device 102 may compress the exact match cache based on the current flow rule set, which may reduce overall memory consumption for the EMC and/or increase the number of entries that may be stored in the EMC, thereby increasing efficiency and/or performance Additionally, the computing device 102 may also improve throughput by reducing the amount of header data that is extracted from each packet header and/or by reducing the amount of data required for header comparisons when looking up EMC entries. Tests for certain cases have indicated that the techniques disclosed herein may improve switching throughput by up to 65%, reduce 87% of cache occupancy, and reduce memory usage by more than 99% as compared to typical systems. As an example, a typical Open vSwitch EMC may reserve 512 bytes for each EMC entry. Continuing that example, for IP routing, the computing device 102 may use 13 bytes (e.g., space for 5-tuple fields) for each EMC entry.

Each computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively include a processor 120, an input/output subsystem 122, a memory 124, a data storage device 126, and a communication subsystem 128, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102, such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 102 may be embodied as any network interface controller or other communication circuit, device, or collection thereof, capable of enabling communications between the computing device 102 and other remote devices over a network. The communication subsystem 128 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 102 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or peripheral devices.

As discussed in more detail below, the computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
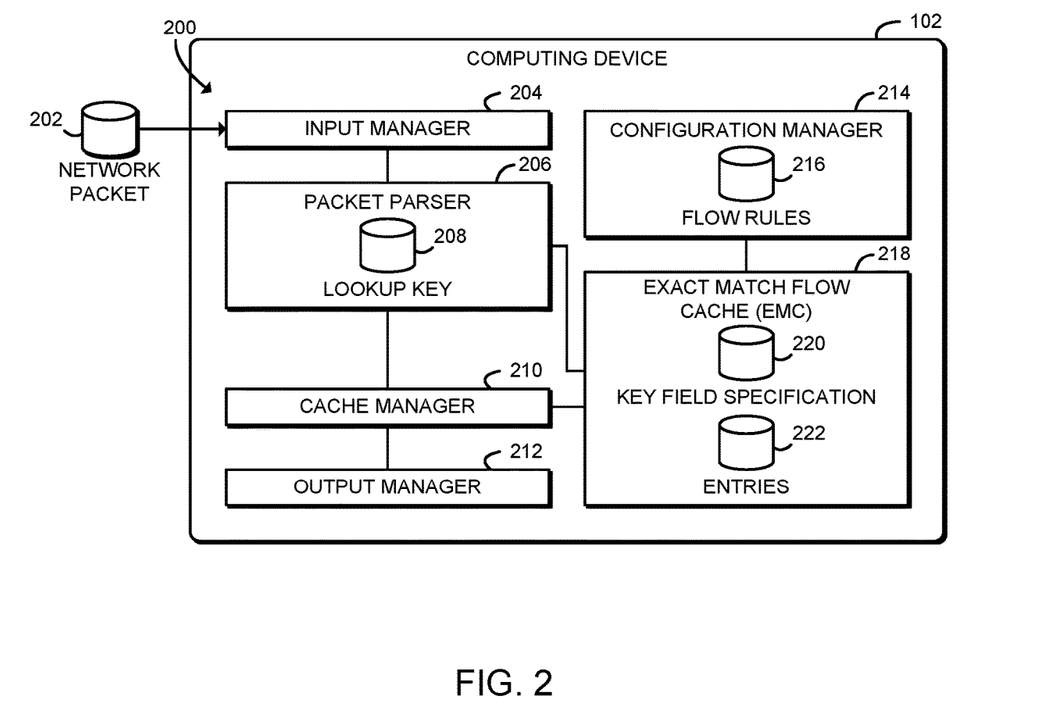
FIG. 2 is a simplified block diagram of at least one embodiment of an environment that may be established by a computing device of FIG. 1.

Referring now to FIG. 2, in an illustrative embodiment, the computing device 102 establishes an environment 200 during operation. The illustrative environment 200 includes an input manager 204, a packet parser 206, a cache manager 210, an output manager 212, a configuration manager 214, and an exact match flow cache (EMC) 218. The various components of the environment 200 may be embodied as hardware, firmware, software, or a combination thereof. As such, in some embodiments, one or more of the components of the environment 200 may be embodied as circuitry or collection of electrical devices (e.g., input manager circuitry 204, packet parser circuitry 206, cache manager circuitry 210, output manager circuitry 212, configuration manager circuitry 214, and/or EMC circuitry 218). It should be appreciated that, in such embodiments, one or more of the input manager circuitry 204, the packet parser circuitry 206, the cache manager circuitry 210, the output manager circuitry 212, the configuration manager circuitry 214, and/or the EMC circuitry 218 may form a portion of one or more of the processor 120, the I/O subsystem 122, the communication subsystem 128, and/or other components of the computing device 102. Additionally, in some embodiments, one or more of the illustrative components may form a portion of another component and/or one or more of the illustrative components may be independent of one another.

The input manager 204 is configured to read a network packet 202 from a network port. The network packet 202 may be received, for example, from a remote computing device 102 or in some embodiments may be generated by the computing device 102, for example by a virtual machine executed by the computing device 102.

The packet parser 206 is configured to extract one or more key fields from the network packet 202 to generate a lookup key 208. Each key field includes one or more bits extracted from a particular position in a header of the network packet 202. The key fields are identified by a key field specification 220 of an exact match flow cache (EMC) 218. As described further below, the key field specification 220 may identify a union of non-wildcard fields of a current flow rule set 216 of the computing device 102.

The cache manager 210 is configured to determine whether the lookup key 208 matches against an entry of the EMC 218. The EMC 218 includes multiple entries 222. Each entry includes a key that corresponds to the key field specification 220 and an action. The action may include forwarding the network packet 202, dropping the network packet 202, or performing any other packet processing operation. The output manager 212 is configured to apply the corresponding action in response to determining that the lookup key 208 matches against an entry 222 of the EMC 218.

The configuration manager 214 is configured to dynamically configure the EMC 218 based on the current flow rule set 216 of the computing device. The configuration manager 214 may be configured to compress the key field specification 220 of the EMC 218 to match the union of non-wildcard fields of the current flow rule set 216 if smaller than the key field specification 220. The configuration manager 214 may be further configured to determine that the current flow rule set 216 is stable before compressing the key field specification 220. The configuration manager 214 may be further configured to expand the key field specification 220 if the union is larger (i.e. covers more fields) than the key field specification 220.

Figure 3:
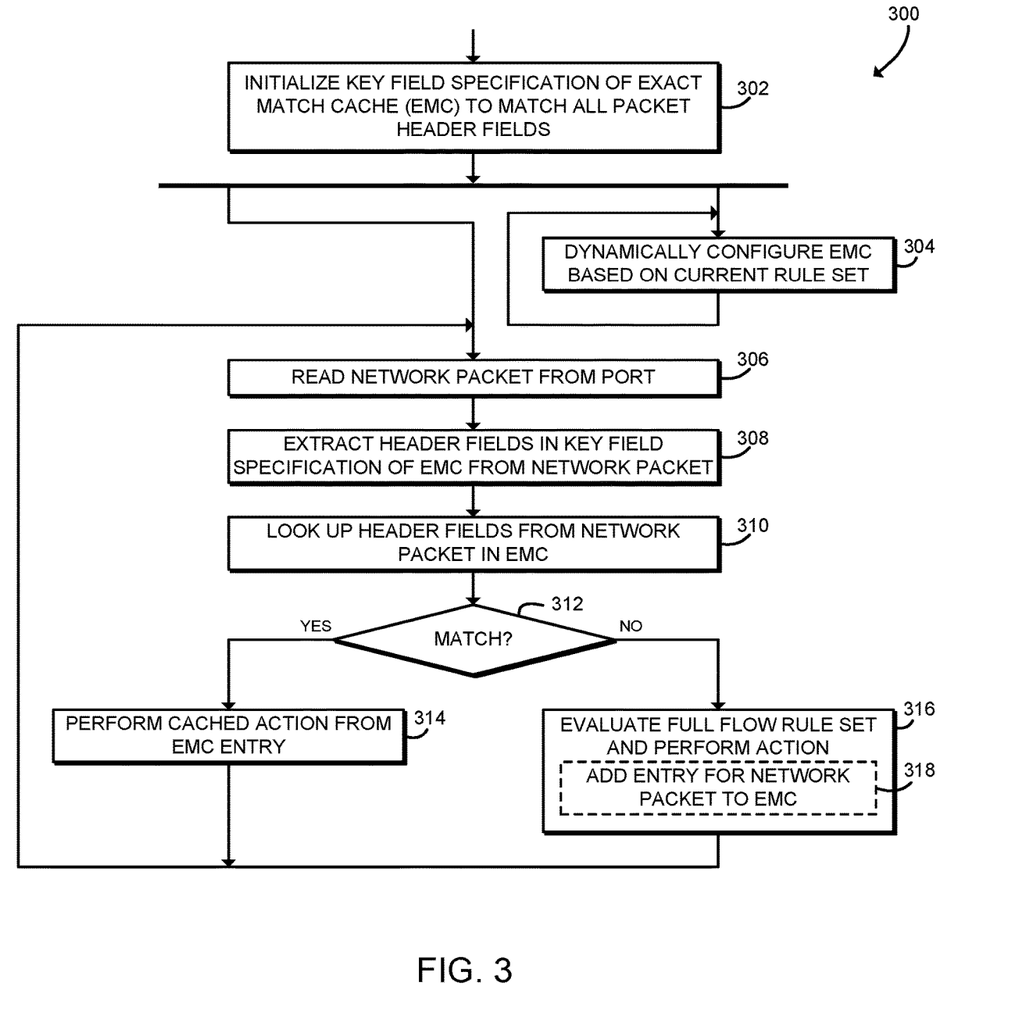
FIG. 3 is a simplified flow diagram of at least one embodiment of a method for packet switching with exact match flow cache compression that may be performed by the computing device of FIGS. 1-2.

Referring now to FIG. 3, in use, a computing device 102 may execute a method 300 for packet processing with exact match flow cache compression. It should be appreciated that, in some embodiments, the operations of the method 300 may be performed by one or more components of the environment 200 of the computing device 102 as shown in FIG. 2. The method 300 begins in block 302, in which the computing device 102 initializes the key field specification 220 of the exact match flow cache (EMC) 218 to match all possible packet header fields. For example, the key field specification 220 may include internet protocol (IP) packet header fields as well as other fields, such as UDP/TCP headers, tunnel fields, and other header fields. The key for each entry 222 in the EMC 218 may also be sized to contain all fields in the key field specification 220. For example, illustratively each entry 222 may be initially allocated 512 bytes in memory. Therefore, upon initialization the EMC 218 may be prepared to cache any flow processed by the computing device 102.

After initializing the EMC 218, the method 300 may proceed in parallel to blocks 304, 306. In block 304, the computing device 102 dynamically configures the EMC 218 based on the current flow rule set 216. In particular, the computing device 102 may compress the key field specification 220 to include the union of relevant, non-wildcard fields of the flow rule set 216. After compressing the key field specification 220, the key for each entry 222 of the EMC 218 may also be reduced in size to include only the data of the compressed key field specification 220, which may reduce memory consumption of the EMC 218. Of course, the computing device 102 may also expand the key field specification 220 as necessary to match the union of non-wildcard fields of the flow rule set 216. Methods for dynamically configuring the EMC 218 based on the current flow rule set 216 are described further below in connection with FIGS. 4-6. The method 300 loops back to block 304 to continue dynamically configuring the EMC 218. Additionally or alternatively, although illustrated as dynamically configuring the EMC 218, it should be understood that in some embodiments the EMC 218 may be statically configured with a compressed key field specification 220. For example, a layer 2 (L2) switch may be configured with a key field specification 220 that includes only the L2 fields of the network packet 202.

Referring back to block 302, the method 300 advances to block 306, in which the computing device 102 reads a network packet 202 from a network port. The network packet 202 may be received, for example, from a remote computing device 102 or in some embodiments may be generated by the computing device 102, for example by a virtual machine executed by the computing device 102. The network packet 202 may be embodied as any IP packet, TCP packet, UDP packet, or other network packet to be processed by the computing device 102.

In block 308, the computing device 102 extracts one or more header fields from the network packet 202 as defined by the key field specification 220 of the EMC 218. The computing device 102 concatenates the extracted header fields to generate a lookup key 208. For example, the key field specification 220 may identify the source IP address and destination IP address header fields of the network packet 202. In that example, the computing device 102 extracts source IP address and destination IP address from the network packet 202 and includes those fields in the lookup key 208.

In block 310, the computing device 102 looks up the lookup key 208, which includes the header fields extracted from the network packet 202, in the EMC 218. The computing device 102 may compare the lookup key 208 against a key included in each entry 222 of the EMC 218 to determine whether an entry 222 matches the network packet 202. Because the EMC 218 is an exact match cache, the lookup key 208 must match the key of the entry 222 exactly, with no wildcards considered. In block 312, the computing device 102 determines whether a matching entry 222 was found. If not, the method 300 branches to block 316, described below. If a matching entry 222 was found, the method 300 branches to block 314.

In block 314, the computing device 102 performs the cached action included in the matching entry 222 of the EMC 218. For example, the computing device 102 may forward the network packet 202, drop the network packet 202, or perform any other packet processing operation on the network packet 202. After performing the action, the method 300 loops back to block 306 to continue processing network packets 202.

Referring back to block 312, if no matching entry 222 was found, the method 300 branches to block 316, in which the computing device 102 evaluates the full flow rule set 216 and performs the corresponding action on the network packet 202. Evaluating the full flow rule set 216 may include classifying the network packet 202, evaluating rule priorities, or otherwise evaluating a complicated set of flow tables. Thus, evaluating the full flow rule set may be significantly more computationally expensive than performing a cache lookup in the EMC 218. In some embodiments, in block 318, after evaluating the full flow rule set 216, the computing device 102 may add an entry 222 to the EMC 218 corresponding to the network packet 202 in order to improve performance for future processing of that flow. After performing the action, the method 300 loops back to block 306 to continue processing network packets 202.

Figure 4:
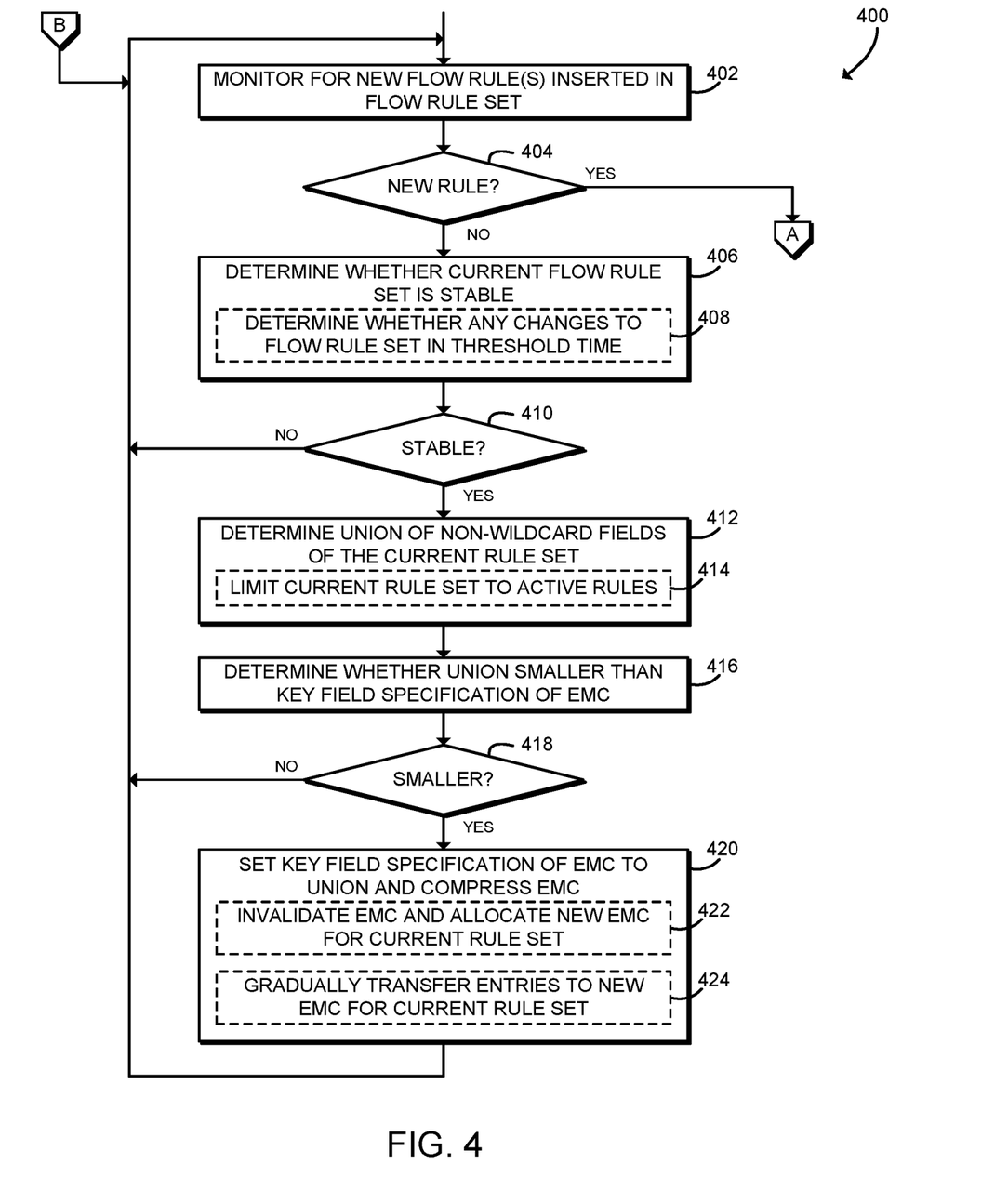
FIGS. 4 and 5 are a simplified flow diagram of at least one embodiment of a method for dynamic cache configuration that may be executed by the computing device of FIGS. 1-2.
Figure 5:
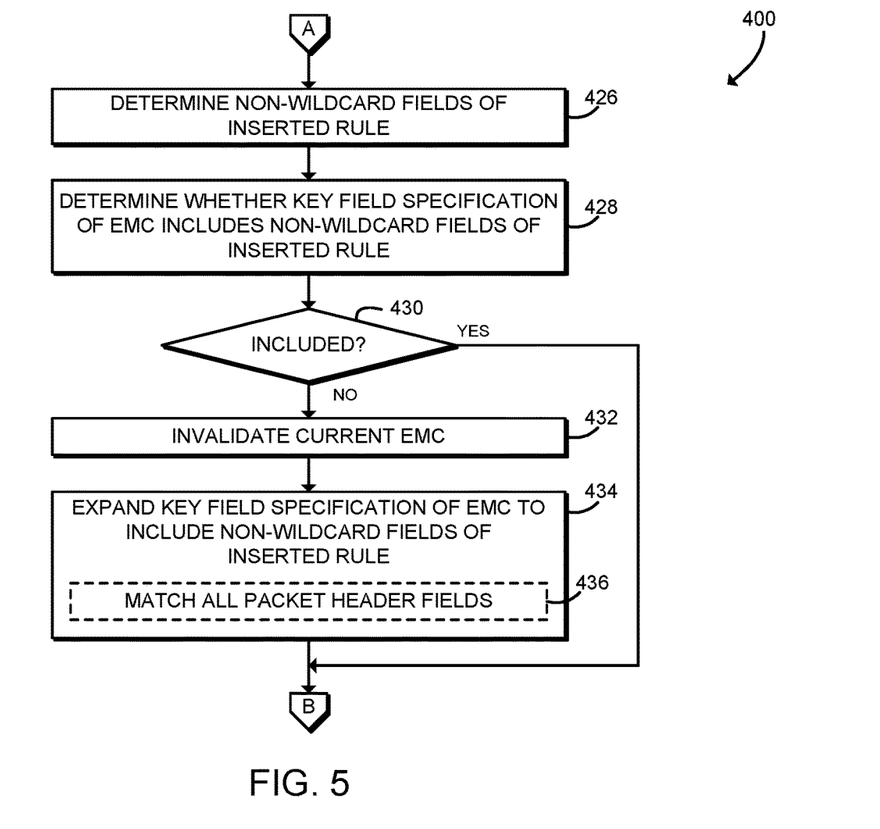

Referring now to FIGS. 4 and 5, in use, the computing device 102 may execute a method 400 for dynamic cache configuration. The method 400 may be executed in connection with block 304 of FIG. 3, as described above. It should be appreciated that, in some embodiments, the operations of the method 400 may be performed by one or more components of the environment 200 of the computing device 102 as shown in FIG. 2. The method 400 begins in block 402, in which the computing device 102 monitors for one or more new flow rules inserted into the flow rule set 216. In block 404, the computing device 102 determines whether a new rule has been inserted into the flow rule set 216. If so, the method 400 branches to block 426, shown in FIG. 5 and described below. If a new rule has not been inserted, the method 400 advances to block 406.

In block 406, the computing device 102 determines whether the current flow rule set 216 is stable. In some embodiments, in block 408 the computing device 102 may determine whether any changes to the flow rule set 216 (e.g., rule insertions, deletions, or modifications) have been observed within a threshold time period. The threshold time period may be on the order of seconds or minutes. Allowing the flow rule set 216 to stabilize may reduce the frequency that the configuration of the EMC 218 is changed, which may reduce cache thrash or otherwise improve performance In block 410, the computing device 102 checks whether the flow rule set 216 is stable. If not, the method 400 loops back to block 402 to continue dynamic configuration of the EMC 218. If the flow rule set 216 is stable, the method 400 advances to block 412.

In block 412, the computing device 102 determines the union of non-wildcard fields of the current rule set 216. The union thus identifies all relevant header fields based on the current rule set 216. In some embodiments, in block 414, the computing device 102 may limit the current rule set 216 to any active rules; for example, to flow rules that have been used recently and/or frequently, and/or higher-priority rules that overlap with the active rules. Limiting to active rules may reduce the size of the union and thus may further reduce the size of the key field specification 220 as described further below. One potential embodiment of a method for identifying active flow rules is described below in connection with FIG. 6. Additionally or alternatively, the active flow rules may be included in an intermediate flow caching layer between the EMC 218 and the flow rule set 216, such as a megaflow layer.

In block 416, the computing device 102 determines whether the union of non-wildcard fields is smaller than the current key field specification 220 of the EMC 218. The computing device 102 may determine whether the union includes fewer header fields, bit positions, or otherwise requires less memory as compared to the current key field specification 220. In block 418, the computing device 102 checks whether the union is smaller than the key field specification 220. If not, (e.g., if the union is equal in size to the key field specification 220), the method 400 loops back to block 402 to continue dynamically configuring the EMC 218. If the union is smaller than the key field specification 220, the method 400 advances to block 420.

In block 420, the computing device 102 sets the key field specification 220 to equal the union of non-wildcard header fields and compresses the EMC 218. Compressing the EMC 218 allows the key of each entry 222 to be reduced in size based on the size of the key field specification. In some embodiments, in block 422 the computing device 102 may immediately invalidate the previous EMC 218 and allocate a new, compressed EMC 218 for the current rule set 216. As incoming network packets 202 are processed, they are all immediately matched against the new, compressed EMC 218. However, as the new EMC 218 is initially empty, throughput may be reduced due to a cold cache effect.

In some embodiments, in block 424 the computing device 102 may gradually transfer entries 222 from the previous EMC 218 to a new, compressed EMC 218. For example, incoming network packets 202 may continue to be matched against the previous EMC 218. In response to each hit in the previous EMC 218, a new entry 222 is allocated in the compressed EMC 218 and the entry 222 in the previous EMC 218 is removed. Once a predetermined threshold of entries are transferred to the compressed EMC 218 (e.g., after a predetermined number of entries 222, after the previous EMC 218 drops below a predetermined hit ratio, or other threshold), the previous EMC 218 may be deleted 218 and processing may transfer completely to the new, compressed EMC 218. In those embodiments, instantaneous throughput may be maintained at the expense of additional complexity and/or memory consumption. After compressing the EMC 218, the method 400 loops back to block 402 to continue dynamically configuring the EMC 218.

Referring back to block 404, if a new rule is inserted into the flow rule set 216, the method 400 branches to block 426, shown in FIG. 5. Referring now to FIG. 5, in block 426 the computing device 102 determines the relevant, non-wildcard fields of the inserted rule. In block 428, the computing device 102 determines whether the key field specification 220 of the EMC 218 includes the non-wildcard fields of the inserted rule. In block 430, the computing device 102 checks whether the key field specification 220 includes the non-wildcard fields. If so, the method 400 loops back to block 402, shown in FIG. 4, to continue dynamically configuring the EMC 218. If the key field specification 220 does not include all of the non-wildcard fields, the method 400 advances to block 432.

In block 432, the computing device 102 invalidates the current EMC 218. The computing device 102 may, for example, delete the EMC 218 and/or its entries 222 and create a new EMC 218. In block 434, the computing device 102 expands the key field specification 220 of the EMC 218 to include the non-wildcard fields of the inserted rule. For example, the computing device 102 may set the key field specification 220 to include the union of all non-wildcard fields for the current rule set 216, including the newly inserted rule. After expanding the key field specification 220, the matching process of FIG. 3 extracts and checks against the fields of the expanded key field specification 220. In some embodiments, in block 436 the computing device 102 may reset the key field specification 220 to match all possible packet header fields. For example, as described above, the key field specification 220 may include internet protocol (IP) packet header fields as well as other fields, such as UDP/TCP headers, tunnel fields, and other header fields. After expanding the key field specification 220, the method 400 loops back to block 402, shown in FIG. 4, to continue dynamically configuring the EMC 218.

Figure 6:
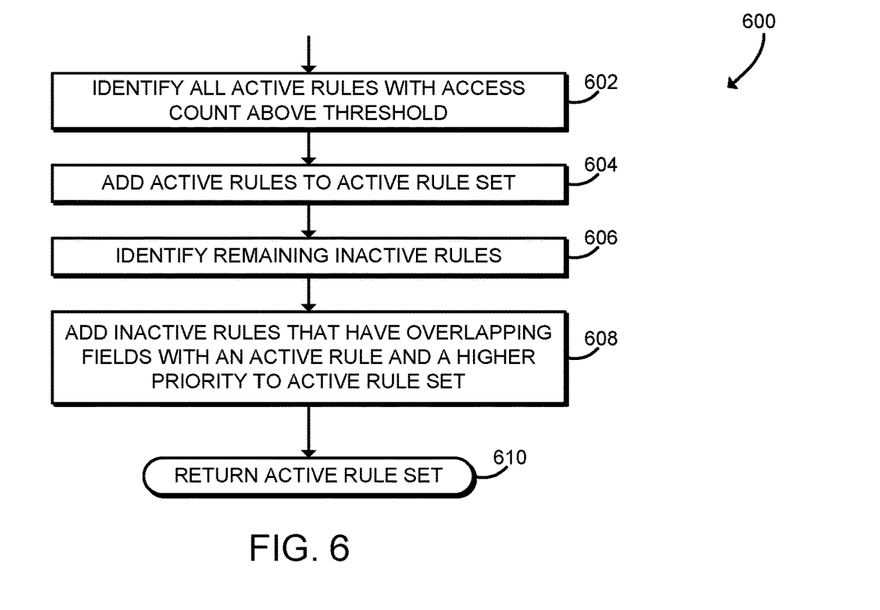
FIG. 6 is a simplified flow diagram of at least one embodiment of a method for identifying active flow rules that may be performed by the computing device of FIGS. 1-2.

Referring now to FIG. 6, in use, the computing device 102 may execute a method 600 for identifying active flow rules. The method 600 may be executed in connection with block 414 of FIG. 4, as described above. It should be appreciated that, in some embodiments, the operations of the method 600 may be performed by one or more components of the environment 200 of the computing device 102 as shown in FIG. 2. The method 600 begins in block 602, in which the computing device 102 identifies all active flow rules with an access count above a predetermined threshold. In block 604, the computing device 102 adds those active rules to an active rule set. In block 606, the computing device 102 identifies the remaining inactive rules as the rules of the current flow rule set 216 that are not included in the active rule set. In block 608, the computing device 102 adds any inactive rule that overlaps with an active rule and has a higher priority than the active rule to the active rule set. Rules overlap each other when a packet may exist that matches both rules. Thus, the active rule set also considers inactive rules that overlap with an active rule and have higher priority. In block 610, the computing device 102 returns the active rule set and the method 600 is completed. As described above, the union of non-wildcard fields of the active rule set may be used to compress the EMC 218.

Figure 7:
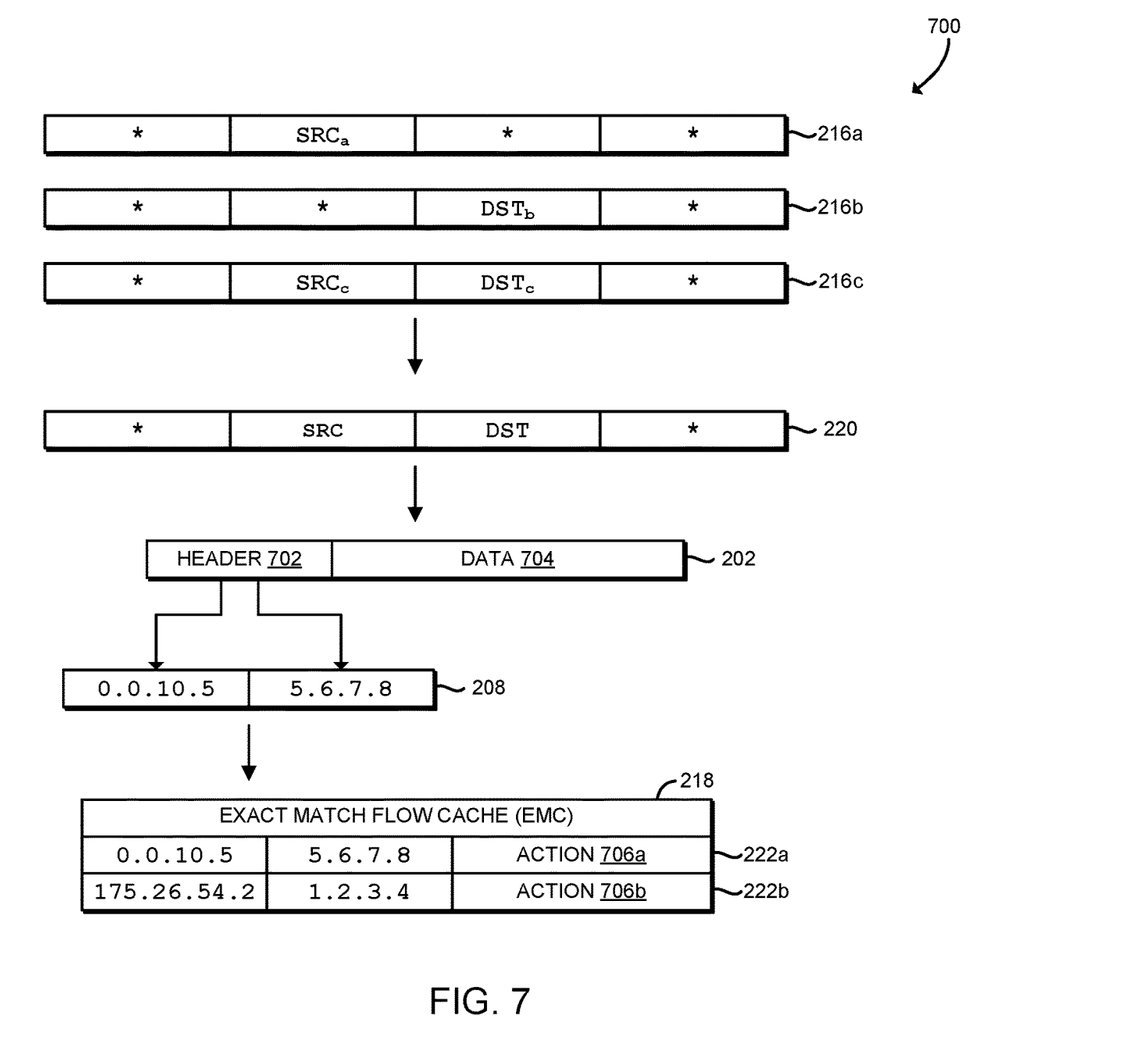
FIG. 7 is a schematic diagram illustrating various data structures used by the computing device of FIGS. 1-2.

Referring now to FIG. 7, diagram 700 illustrates one potential embodiment of various data structures that may be established by the computing device 102. Illustratively, the diagram 700 includes three flow rules 216a, 216b, 216c. As shown, the rule 216a includes one non-wildcard field (source IP address), the rule 216b includes one non-wildcard field (destination IP address), and the rule 216c includes two non-wildcard fields (source IP address and destination IP address). As shown, the union of non-wildcard fields of the rules 216a, 216b, 216c may be used to generate the key field specification 220 that includes two fields, source IP address and destination IP address.

As shown, a network packet 202 may include a header 702 and packet data 704. Applying the key field specification 220, the source IP address and the destination IP address may be extracted from the header 702 to generate the lookup key 208, which is illustratively 0.0.10.5 and 5.6.7.8. As shown, the lookup key 208 may be matched against entries 222a, 222b of the EMC 218 to select an appropriate action 706a, 706b. Illustratively, the lookup key 208 exactly matches against the entry 222a. Thus, in the illustrative embodiment the computing device 102 would apply the action 706a when processing the network packet 202. As described above, if the lookup key 208 did not match any entry 222 of the EMC 218, the computing device 102 may process the network packet 202 using the full current flow set 216.

It should be appreciated that, in some embodiments, the methods 300, 400, and/or 600 may be embodied as various instructions stored on a computer-readable media, which may be executed by the processor 120, the I/O subsystem 122, the communication subsystem 128, and/or other components of a computing device 102 to cause the computing device 102 to perform the respective method 300, 400, and/or 600. The computer-readable media may be embodied as any type of media capable of being read by the computing device 102 including, but not limited to, the memory 124, the data storage device 126, firmware devices, and/or other media.

Examples

Illustrative examples of the technologies disclosed herein are provided below. An embodiment of the technologies may include any one or more, and any combination of, the examples described below.

Example 1 includes a computing device for flow cache compression, the computing device comprising: one or more processors; and one or more memory devices having stored therein a plurality of instructions that, when executed by the one or more processors, cause the computing device to: read a network packet from a network port; extract one or more key fields from the network packet to generate a lookup key, wherein the key fields are identified by a key field specification of an exact match flow cache; determine whether the lookup key matches against an entry of the exact match flow cache, wherein the exact match flow cache comprises a plurality of entries, and wherein each entry comprises a key that corresponds to the key field specification and an action; and apply the action in response to a determination that the lookup key matches against the entry of the exact match flow cache.

Example 2 includes the subject matter of Example 1, and wherein each key field comprises one or more bit positions located in a header of the network packet.

Example 3 includes the subject matter of any of Examples 1 and 2, and wherein the key field specification of the exact match flow cache identifies a union of non-wildcard fields of a current flow rule set of the computing device.

Example 4 includes the subject matter of any of Examples 1-3, and wherein the one or more memory devices have stored therein a plurality of instructions that, when executed by the one or more processors, further cause the computing device to dynamically configure the exact match flow cache based on a current flow rule set of the computing device.

Example 5 includes the subject matter of any of Examples 1-4, and wherein to dynamically configure the exact match flow cache based on the current flow rule set comprises to: determine a first union of non-wildcard fields of the current flow rule set of the computing device; determine whether the first union is smaller than the key field specification of the exact match flow cache; and compress the key field specification of the exact match flow cache to match the first union in response to a determination that the first union is smaller than the key field specification.

Example 6 includes the subject matter of any of Examples 1-5, and wherein to determine whether the first union is smaller than the key field specification comprises to determine whether the first union includes fewer bits than the key field specification.

Example 7 includes the subject matter of any of Examples 1-6, and wherein to compress the key field specification comprises to: invalidate the entries of the exact match flow cache; and set the key field specification of the exact match flow cache to match the first union.

Example 8 includes the subject matter of any of Examples 1-7, and wherein to compress the key field specification comprises to: create a new exact match flow cache with a key field specification equal to the first union; and transfer entries from the exact match flow cache to the new exact match flow cache in response to creating the new exact match flow cache.

Example 9 includes the subject matter of any of Examples 1-8, and wherein to transfer the entries comprises to: add the entry to the new exact match flow cache in response to the determination that the lookup key matches against the entry of the exact match flow cache; and remove the entry from the exact match flow cache in response to addition of the entry to the new exact match flow cache.

Example 10 includes the subject matter of any of Examples 1-9, and wherein to transfer the entries further comprises to: determine whether the exact match cache includes less than a predetermined threshold number of entries; and delete the exact match cache in response to a determination that the exact match cache includes less than the predetermined threshold number of entries.

Example 11 includes the subject matter of any of Examples 1-10, and wherein to determine the first union of non-wildcard fields of the current flow rule set comprises to determine a first union of non-wildcard fields of one or more active flow rules of the current flow rule set.

Example 12 includes the subject matter of any of Examples 1-11, and wherein to determine the first union of non-wildcard fields of the one or more active flow rules comprises to: identify one or more active flow rules that each have an access count above a predetermined threshold; identify one or more priority inactive flow rules, wherein each priority inactive flow rule overlaps with an active flow rule and a higher priority than the active flow rule; and add the one or more priority inactive flow rules to the active flow rules in response to identification of the one or more priority inactive flow rules.

Example 13 includes the subject matter of any of Examples 1-12, and wherein the one or more memory devices have stored therein a plurality of instructions that, when executed by the one or more processors, further cause the computing device to determine whether the current flow rule set is stable; wherein to determine the first union of the non-wildcard fields comprises to determine the first union of the non-wildcard fields in response to a determination that the current flow rule set is stable.

Example 14 includes the subject matter of any of Examples 1-13, and wherein to determine whether the current flow rule set is stable comprises to determine whether any flow rule has been inserted in the current flow rule set within a predetermined length of time.

Example 15 includes the subject matter of any of Examples 1-14, and wherein to dynamically configure the exact match flow cache based on the current flow rule set comprises to: insert a first rule into the current flow rule set; determine a first union of non-wildcard fields of the current flow rule set in response to insertion of the first rule into the current flow rule set; determine whether the first union is larger than the key field specification of the exact match flow cache; and expand the key field specification of the exact match flow cache to include the first union in response to a determination that the first union is larger than the key field specification.

Example 16 includes the subject matter of any of Examples 1-15, and wherein to expand the key field specification of the exact match flow cache comprises to: invalidate the entries of the exact match flow cache; and set the key field specification of the exact match flow cache to include the first union in response to invalidation of the entries of the exact match flow cache.

Example 17 includes a method for flow cache compression, the method comprising: reading, by a computing device, a network packet from a network port; extracting, by the computing device, one or more key fields from the network packet to generate a lookup key, wherein the key fields are identified by a key field specification of an exact match flow cache; determining, by the computing device, whether the lookup key matches against an entry of the exact match flow cache, wherein the exact match flow cache comprises a plurality of entries, and wherein each entry comprises a key that corresponds to the key field specification and an action; and applying, by the computing device, the action in response to determining that the lookup key matches against the entry of the exact match flow cache.

Example 18 includes the subject matter of Example 17, and wherein each key field comprises one or more bit positions located in a header of the network packet.

Example 19 includes the subject matter of any of Examples 17 and 18, and wherein the key field specification of the exact match flow cache identifies a union of non-wildcard fields of a current flow rule set of the computing device.

Example 20 includes the subject matter of any of Examples 17-19, and further comprising dynamically configuring, by the computing device, the exact match flow cache based on a current flow rule set of the computing device.

Example 21 includes the subject matter of any of Examples 17-20, and wherein dynamically configuring the exact match flow cache based on the current flow rule set comprises: determining a first union of non-wildcard fields of the current flow rule set of the computing device; determining whether the first union is smaller than the key field specification of the exact match flow cache; and compressing the key field specification of the exact match flow cache to match the first union in response to determining that the first union is smaller than the key field specification.

Example 22 includes the subject matter of any of Examples 17-21, and wherein determining whether the first union is smaller than the key field specification comprises determining whether the first union includes fewer bits than the key field specification.

Example 23 includes the subject matter of any of Examples 17-22, and wherein compressing the key field specification comprises: invalidating the entries of the exact match flow cache; and setting the key field specification of the exact match flow cache to match the first union.

Example 24 includes the subject matter of any of Examples 17-23, and wherein compressing the key field specification comprises: creating a new exact match flow cache with a key field specification equal to the first union; and transferring entries from the exact match flow cache to the new exact match flow cache in response to creating the new exact match flow cache.

Example 25 includes the subject matter of any of Examples 17-24, and wherein transferring the entries comprises: adding the entry to the new exact match flow cache in response to determining that the lookup key matches against the entry of the exact match flow cache; and removing the entry from the exact match flow cache in response to adding the entry to the new exact match flow cache.

Example 26 includes the subject matter of any of Examples 17-25, and wherein transferring the entries further comprises: determining whether the exact match cache includes less than a predetermined threshold number of entries; and deleting the exact match cache in response to determining that the exact match cache includes less than the predetermined threshold number of entries.

Example 27 includes the subject matter of any of Examples 17-26, and wherein determining the first union of non-wildcard fields of the current flow rule set comprises determining a first union of non-wildcard fields of one or more active flow rules of the current flow rule set.

Example 28 includes the subject matter of any of Examples 17-27, and wherein determining the first union of non-wildcard fields of the one or more active flow rules comprises: identifying one or more active flow rules that each have an access count above a predetermined threshold; identifying one or more priority inactive flow rules, wherein each priority inactive flow rule overlaps with an active flow rule and a higher priority than the active flow rule; and adding the one or more priority inactive flow rules to the active flow rules in response to identifying the one or more priority inactive flow rules.

Example 29 includes the subject matter of any of Examples 17-28, and further comprising: determining, by the computing device, whether the current flow rule set is stable; wherein determining the first union of the non-wildcard fields comprises determining the first union of the non-wildcard fields in response to determining that the current flow rule set is stable.

Example 30 includes the subject matter of any of Examples 17-29, and wherein determining whether the current flow rule set is stable comprises determining whether any flow rule has been inserted in the current flow rule set within a predetermined length of time.

Example 31 includes the subject matter of any of Examples 17-30, and wherein dynamically configuring the exact match flow cache based on the current flow rule set comprises: inserting a first rule into the current flow rule set; determining a first union of non-wildcard fields of the current flow rule set in response to inserting the first rule into the current flow rule set; determining whether the first union is larger than the key field specification of the exact match flow cache; and expanding the key field specification of the exact match flow cache to include the first union in response to determining that the first union is larger than the key field specification.

Example 32 includes the subject matter of any of Examples 17-31, and wherein expanding the key field specification of the exact match flow cache comprises: invalidating the entries of the exact match flow cache; and setting the key field specification of the exact match flow cache to include the first union in response to invalidating the entries of the exact match flow cache.

Example 33 includes a computing device comprising: a processor; and a memory having stored therein a plurality of instructions that when executed by the processor cause the computing device to perform the method of any of Examples 17-32.

Example 34 includes one or more non-transitory, computer readable storage media comprising a plurality of instructions stored thereon that in response to being executed result in a computing device performing the method of any of Examples 17-32.

Example 35 includes a computing device comprising means for performing the method of any of Examples 17-32.

Example 36 includes a computing device for flow cache compression, the computing device comprising: input manager circuitry to read a network packet from a network port; packet parser circuitry to extract one or more key fields from the network packet to generate a lookup key, wherein the key fields are identified by a key field specification of an exact match flow cache; cache manager circuitry to determine whether the lookup key matches against an entry of the exact match flow cache, wherein the exact match flow cache comprises a plurality of entries, and wherein each entry comprises a key that corresponds to the key field specification and an action; and output manager circuitry to apply the action in response to a determination that the lookup key matches against the entry of the exact match flow cache.

Example 37 includes the subject matter of Example 36, and wherein each key field comprises one or more bit positions located in a header of the network packet.

Example 38 includes the subject matter of any of Examples 36 and 37, and wherein the key field specification of the exact match flow cache identifies a union of non-wildcard fields of a current flow rule set of the computing device.

Example 39 includes the subject matter of any of Examples 36-38, and further comprising configuration manager circuitry to dynamically configure the exact match flow cache based on a current flow rule set of the computing device.

Example 40 includes the subject matter of any of Examples 36-39, and wherein to dynamically configure the exact match flow cache based on the current flow rule set comprises to: determine a first union of non-wildcard fields of the current flow rule set of the computing device; determine whether the first union is smaller than the key field specification of the exact match flow cache; and compress the key field specification of the exact match flow cache to match the first union in response to a determination that the first union is smaller than the key field specification.

Example 41 includes the subject matter of any of Examples 36-40, and wherein to determine whether the first union is smaller than the key field specification comprises to determine whether the first union includes fewer bits than the key field specification.

Example 42 includes the subject matter of any of Examples 36-41, and wherein to compress the key field specification comprises to: invalidate the entries of the exact match flow cache; and set the key field specification of the exact match flow cache to match the first union.

Example 43 includes the subject matter of any of Examples 36-42, and wherein to compress the key field specification comprises to: create a new exact match flow cache with a key field specification equal to the first union; and transfer entries from the exact match flow cache to the new exact match flow cache in response to creating the new exact match flow cache.

Example 44 includes the subject matter of any of Examples 36-43, and wherein to transfer the entries comprises to: add the entry to the new exact match flow cache in response to the determination that the lookup key matches against the entry of the exact match flow cache; and remove the entry from the exact match flow cache in response to addition of the entry to the new exact match flow cache.

Example 45 includes the subject matter of any of Examples 36-44, and wherein to transfer the entries further comprises to: determine whether the exact match cache includes less than a predetermined threshold number of entries; and delete the exact match cache in response to a determination that the exact match cache includes less than the predetermined threshold number of entries.

Example 46 includes the subject matter of any of Examples 36-45, and wherein to determine the first union of non-wildcard fields of the current flow rule set comprises to determine a first union of non-wildcard fields of one or more active flow rules of the current flow rule set.

Example 47 includes the subject matter of any of Examples 36-46, and wherein to determine the first union of non-wildcard fields of the one or more active flow rules comprises to: identify one or more active flow rules that each have an access count above a predetermined threshold; identify one or more priority inactive flow rules, wherein each priority inactive flow rule overlaps with an active flow rule and a higher priority than the active flow rule; and add the one or more priority inactive flow rules to the active flow rules in response to identification of the one or more priority inactive flow rules.

Example 48 includes the subject matter of any of Examples 36-47, and wherein the configuration manager circuitry is further to determine whether the current flow rule set is stable; wherein to determine the first union of the non-wildcard fields comprises to determine the first union of the non-wildcard fields in response to a determination that the current flow rule set is stable.

Example 49 includes the subject matter of any of Examples 36-48, and wherein to determine whether the current flow rule set is stable comprises to determine whether any flow rule has been inserted in the current flow rule set within a predetermined length of time.

Example 50 includes the subject matter of any of Examples 36-49, and wherein to dynamically configure the exact match flow cache based on the current flow rule set comprises to: insert a first rule into the current flow rule set; determine a first union of non-wildcard fields of the current flow rule set in response to insertion of the first rule into the current flow rule set; determine whether the first union is larger than the key field specification of the exact match flow cache; and expand the key field specification of the exact match flow cache to include the first union in response to a determination that the first union is larger than the key field specification.

Example 51 includes the subject matter of any of Examples 36-50, and wherein to expand the key field specification of the exact match flow cache comprises to: invalidate the entries of the exact match flow cache; and set the key field specification of the exact match flow cache to include the first union in response to invalidation of the entries of the exact match flow cache.

Example 52 includes a computing device for flow cache compression, the computing device comprising: circuitry for reading a network packet from a network port; means for extracting one or more key fields from the network packet to generate a lookup key, wherein the key fields are identified by a key field specification of an exact match flow cache; means for determining whether the lookup key matches against an entry of the exact match flow cache, wherein the exact match flow cache comprises a plurality of entries, and wherein each entry comprises a key that corresponds to the key field specification and an action; and means for applying the action in response to determining that the lookup key matches against the entry of the exact match flow cache.

Example 53 includes the subject matter of Example 52, and wherein each key field comprises one or more bit positions located in a header of the network packet.

Example 54 includes the subject matter of any of Examples 52 and 53, and wherein the key field specification of the exact match flow cache identifies a union of non-wildcard fields of a current flow rule set of the computing device.

Example 55 includes the subject matter of any of Examples 52-54, and further comprising means for dynamically configuring the exact match flow cache based on a current flow rule set of the computing device.

Example 56 includes the subject matter of any of Examples 52-55, and wherein the means for dynamically configuring the exact match flow cache based on the current flow rule set comprises: means for determining a first union of non-wildcard fields of the current flow rule set of the computing device; means for determining whether the first union is smaller than the key field specification of the exact match flow cache; and means for compressing the key field specification of the exact match flow cache to match the first union in response to determining that the first union is smaller than the key field specification.

Example 57 includes the subject matter of any of Examples 52-56, and wherein the means for determining whether the first union is smaller than the key field specification comprises means for determining whether the first union includes fewer bits than the key field specification.

Example 58 includes the subject matter of any of Examples 52-57, and wherein the means for compressing the key field specification comprises: means for invalidating the entries of the exact match flow cache; and means for setting the key field specification of the exact match flow cache to match the first union.

Example 59 includes the subject matter of any of Examples 52-58, and wherein the means for compressing the key field specification comprises: means for creating a new exact match flow cache with a key field specification equal to the first union; and means for transferring entries from the exact match flow cache to the new exact match flow cache in response to creating the new exact match flow cache.

Example 60 includes the subject matter of any of Examples 52-59, and wherein the means for transferring the entries comprises: means for adding the entry to the new exact match flow cache in response to determining that the lookup key matches against the entry of the exact match flow cache; and means for removing the entry from the exact match flow cache in response to adding the entry to the new exact match flow cache.

Example 61 includes the subject matter of any of Examples 52-60, and wherein the means for transferring the entries further comprises: means for determining whether the exact match cache includes less than a predetermined threshold number of entries; and means for deleting the exact match cache in response to determining that the exact match cache includes less than the predetermined threshold number of entries.

Example 62 includes the subject matter of any of Examples 52-61, and wherein the means for determining the first union of non-wildcard fields of the current flow rule set comprises means for determining a first union of non-wildcard fields of one or more active flow rules of the current flow rule set.

Example 63 includes the subject matter of any of Examples 52-62, and wherein the means for determining the first union of non-wildcard fields of the one or more active flow rules comprises: means for identifying one or more active flow rules that each have an access count above a predetermined threshold; means for identifying one or more priority inactive flow rules, wherein each priority inactive flow rule overlaps with an active flow rule and a higher priority than the active flow rule; and means for adding the one or more priority inactive flow rules to the active flow rules in response to identifying the one or more priority inactive flow rules.

Example 64 includes the subject matter of any of Examples 52-63, and further comprising: means for determining whether the current flow rule set is stable; wherein the means for determining the first union of the non-wildcard fields comprises means for determining the first union of the non-wildcard fields in response to determining that the current flow rule set is stable.

Example 65 includes the subject matter of any of Examples 52-64, and wherein the means for determining whether the current flow rule set is stable comprises means for determining whether any flow rule has been inserted in the current flow rule set within a predetermined length of time.

Example 66 includes the subject matter of any of Examples 52-65, and wherein the means for dynamically configuring the exact match flow cache based on the current flow rule set comprises: means for inserting a first rule into the current flow rule set; means for determining a first union of non-wildcard fields of the current flow rule set in response to inserting the first rule into the current flow rule set; means for determining whether the first union is larger than the key field specification of the exact match flow cache; and means for expanding the key field specification of the exact match flow cache to include the first union in response to determining that the first union is larger than the key field specification.

Example 67 includes the subject matter of any of Examples 52-66, and wherein the means for expanding the key field specification of the exact match flow cache comprises: means for invalidating the entries of the exact match flow cache; and means for setting the key field specification of the exact match flow cache to include the first union in response to invalidating the entries of the exact match flow cache.

The invention claimed is:

1. A computing device for flow cache compression, the computing device comprising:
one or more processors; and
one or more memory devices having stored therein a plurality of instructions that, when executed by the one or more processors, cause the computing device to:
read a network packet from a network port;
extract one or more key fields from the network packet to generate a lookup key, wherein the key fields are identified by a key field specification of an exact match flow cache;
dynamically configure the exact match flow cache based on a current flow rule set of the computing device comprises to:
determine a first union of non-wildcard fields of the current flow rule set of the computing device;
determine whether the first union is smaller than the key field specification of the exact match flow cache; and
compress the key field specification of the exact match flow cache to match the first union in response to a determination that the first union is smaller than the key field specification;
determine whether the lookup key matches against an entry of the exact match flow cache, wherein the exact match flow cache comprises a plurality of entries, and wherein each entry comprises a key that corresponds to the key field specification and an action; and
apply the action in response to a determination that the lookup key matches against the entry of the exact match flow cache.

2. The computing device of claim 1, wherein each key field comprises one or more bit positions located in a header of the network packet.

3. The computing device of claim 1, wherein the key field specification of the exact match flow cache identifies a union of non-wildcard fields of a current flow rule set of the computing device.

4. The computing device of claim 1, wherein to determine whether the first union is smaller than the key field specification comprises to determine whether the first union includes fewer bits than the key field specification.

5. The computing device of claim 1, wherein to compress the key field specification comprises to:
invalidate the plurality of entries of the exact match flow cache; and
set the key field specification of the exact match flow cache to match the first union.

6. The computing device of claim 1, wherein to compress the key field specification comprises to:
create a new exact match flow cache with a key field specification equal to the first union; and
transfer entries from the exact match flow cache to the new exact match flow cache in response to creating the new exact match flow cache.

7. The computing device of claim 6, wherein to transfer the entries comprises to:
add the entry of the exact match cache to the new exact match flow cache in response to the determination that the lookup key matches against the entry of the exact match flow cache; and
remove the entry of the exact match cache from the exact match flow cache in response to addition of the entry of the exact match cache to the new exact match flow cache.

8. The computing device of claim 7, wherein to transfer the entries further comprises to:
determine whether the exact match flow cache includes less than a predetermined threshold number of entries; and
delete the exact match flow cache in response to a determination that the exact match flow cache includes less than the predetermined threshold number of entries.

9. The computing device of claim 1, wherein to determine the first union of non-wildcard fields of the current flow rule set comprises to determine a first union of non-wildcard fields of one or more active flow rules of the current flow rule set.

10. The computing device of claim 9, wherein to determine the first union of non-wildcard fields of the one or more active flow rules comprises to:
identify one or more active flow rules that each have an access count above a predetermined threshold;
identify one or more priority inactive flow rules, wherein each priority inactive flow rule overlaps with an active flow rule and a higher priority than the active flow rule; and
add the one or more priority inactive flow rules to the active flow rules in response to identification of the one or more priority inactive flow rules.

11. The computing device of claim 1, wherein the one or more memory devices have stored therein a plurality of instructions that, when executed by the one or more processors, further cause the computing device to determine whether the current flow rule set is stable;
wherein to determine the first union of the non-wildcard fields comprises to determine the first union of the non-wildcard fields in response to a determination that the current flow rule set is stable.

12. The computing device of claim 11, wherein to determine whether the current flow rule set is stable comprises to determine whether any flow rule has been inserted in the current flow rule set within a predetermined length of time.

13. The computing device of claim 1, wherein to dynamically configure the exact match flow cache based on the current flow rule set comprises to:
insert a first rule into the current flow rule set;
determine a first union of non-wildcard fields of the current flow rule set in response to insertion of the first rule into the current flow rule set;
determine whether the first union is larger than the key field specification of the exact match flow cache; and
expand the key field specification of the exact match flow cache to include the first union in response to a determination that the first union is larger than the key field specification.

14. The computing device of claim 13, wherein to expand the key field specification of the exact match flow cache comprises to:
invalidate the plurality of entries of the exact match flow cache; and
set the key field specification of the exact match flow cache to include the first union in response to invalidation of the entries of the exact match flow cache.

15. One or more non-transitory computer-readable storage media comprising a plurality of instructions stored thereon that, when executed by a computing device cause the computing device to:

read a network packet from a network port;
extract one or more key fields from the network packet to generate a lookup key, wherein the key fields are identified by a key field specification of an exact match flow cache;
dynamically configure the exact match flow cache based on a current flow rule set of the computing device comprises to:
determine a first union of non-wildcard fields of the current flow rule set of the computing device;
determine whether the first union is smaller than the key field specification of the exact match flow cache; and
compress the key field specification of the exact match flow cache to match the first union in response to a determination that the first union is smaller than the key field specification;
determine whether the lookup key matches against an entry of the exact match flow cache, wherein the exact match flow cache comprises a plurality of entries, and wherein each entry comprises a key that corresponds to the key field specification and an action; and
apply the action in response to determining that the lookup key matches against the entry of the exact match flow cache.

16. The one or more non-transitory computer-readable storage media of claim 15, wherein to compress the key field specification comprises to:
create a new exact match flow cache with a key field specification equal to the first union; and
transfer entries from the exact match flow cache to the new exact match flow cache in response to creating the new exact match flow cache.

17. The one or more non-transitory computer-readable storage media of claim 15, wherein to determine the first union of non-wildcard fields of the current flow rule set comprises to determine a first union of non-wildcard fields of one or more active flow rules of the current flow rule set.

18. The one or more non-transitory computer-readable storage media of claim 17, wherein to determine the first union of non-wildcard fields of the one or more active flow rules comprises to:
identify one or more active flow rules that each have an access count above a predetermined threshold;
identify one or more priority inactive flow rules, wherein each priority inactive flow rule overlaps with an active flow rule and a higher priority than the active flow rule; and
add the one or more priority inactive flow rules to the active flow rules in response to identifying the one or more priority inactive flow rules.

19. The one or more non-transitory computer-readable storage media of claim 15, further comprising a plurality of instructions stored thereon that, when executed by the computing device cause the computing device to:
determine whether the current flow rule set is stable;
wherein to determine the first union of the non-wildcard fields comprises to determine the first union of the non-wildcard fields in response to determining that the current flow rule set is stable.

20. The one or more non-transitory computer-readable storage media of claim 15, wherein to dynamically configure the exact match flow cache based on the current flow rule set comprises to:
insert a first rule into the current flow rule set;
determine a first union of non-wildcard fields of the current flow rule set in response to inserting the first rule into the current flow rule set;
determine whether the first union is larger than the key field specification of the exact match flow cache; and
expand the key field specification of the exact match flow cache to include the first union in response to determining that the first union is larger than the key field specification.

21. A method for flow cache compression, the method comprising:
reading, by a computing device, a network packet from a network port;
extracting, by the computing device, one or more key fields from the network packet to generate a lookup key, wherein the key fields are identified by a key field specification of an exact match flow cache;
dynamically configuring, by the computing device, the exact match flow cache based on a current flow rule set of the computing device comprises:
determining a first union of non-wildcard fields of the current flow rule set of the computing device;
determining whether the first union is smaller than the key field specification of the exact match flow cache; and
compressing the key field specification of the exact match flow cache to match the first union in response to determining that the first union is smaller than the key field specification;
determining, by the computing device, whether the lookup key matches against an entry of the exact match flow cache, wherein the exact match flow cache comprises a plurality of entries, and wherein each entry comprises a key that corresponds to the key field specification and an action; and
applying, by the computing device, the action in response to determining that the lookup key matches against the entry of the exact match flow cache.

22. The method of claim 21, wherein dynamically configuring the exact match flow cache based on the current flow rule set comprises:
inserting a first rule into the current flow rule set;
determining a first union of non-wildcard fields of the current flow rule set in response to inserting the first rule into the current flow rule set;
determining whether the first union is larger than the key field specification of the exact match flow cache; and
expanding the key field specification of the exact match flow cache to include the first union in response to determining that the first union is larger than the key field specification.

* * * * *